(12) United States Patent
Kawahara et al.

(10) Patent No.: US 6,910,209 B2
(45) Date of Patent: Jun. 21, 2005

(54) CLEAN THREAD TERMINATION

(75) Inventors: Hideya Kawahara, Mountain View, CA (US); William F. Foote, Los Angeles, CA (US); Dean R. E. Long, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 689 days.

(21) Appl. No.: 09/846,064

(22) Filed: Apr. 30, 2001

(65) Prior Publication Data

US 2002/0161816 A1 Oct. 31, 2002

(51) Int. Cl.⁷ .............................................. G06F 9/46
(52) U.S. Cl. ...................... 718/102; 718/100; 718/103; 718/105
(58) Field of Search ......................... 718/100; 717/115, 717/116, 130; 711/122; 712/4, 229, 41

(56) References Cited

U.S. PATENT DOCUMENTS

| | | | | |
|---|---|---|---|---|
| 6,081,665 A | * | 6/2000 | Nilsen et al. | 717/116 |
| 6,108,754 A | * | 8/2000 | Lindholm | 711/122 |
| 6,711,739 B1 | * | 3/2004 | Kutcher | 718/1 |

OTHER PUBLICATIONS

Czajkowski, Grzegorz, et al., "*JRes: A Resource Accounting Interface for Java*," In Proceedings of the 1998 ACM OOPSLA Conference, Vancouver, BC, Oct. 1998.

Philippe Bernadat, Laura Feeney, Dan Lambright, and Franco Travostino, "*Java Sandboxes meet Service Guarantees: Secure Partitioning of CPU and Memory*," Dec. 14, 1998, 24 pp.

Li Gong, "*Secure Java Class Loading*," Nov.–Dec. 1998, Mobile Code Security, pp. 56–61.

(Continued)

*Primary Examiner*—Majid Banankhah
(74) *Attorney, Agent, or Firm*—Beyer Weaver & Thomas LLP

(57) ABSTRACT

Apparatus, methods, and computer program products are disclosed for a process of terminating a thread in a clean, certain, and forcible manner. A thread is forcibly terminated in such a manner that data structures in the system are not left in an inconsistent state and the overall system status is not damaged. The methods and systems described are for terminating a thread in a computer language execution environment. Methods are implemented in an interpretive loop executing in a language that is interpreted and in runtime support libraries in a language that are not interpreted. A method of forcibly terminating a thread in a computer language execution environment is described. A thread receives a terminate thread command. The thread has associated with it a termination flag, a value of the termination flag being immutable once set, and one or more monitors. The termination flag is then set for the thread. An exception is then propagated in the execution environment thereby indicating termination of the thread. The exception handler and the finally clause of the thread is ignored during thread termination. The monitors associated with the thread are then exited.

20 Claims, 8 Drawing Sheets

U.S. PATENT DOCUMENTS

Chris Hawblitzel, Chi–Chao Chang, Grzegorz Czajkowski, Deyu Hu, and Thorsten von Eicken, "*Implementing Multiple Protection Domains in Java*," Technical Report 97–1660, Department of Computer Science, Cornell University, 15 pp.

William F. Foote, "Apparatus And Methods For Preventing Denial Of Service Attacks," U.S. Appl. No. 09/394,121, filed Sep. 10, 1999, 42 Pages.

William F. Foote, "Apparatus And Methods For Managing Resource Usage," U.S. Appl. No. 09/394,118, filed Sep. 10, 1999, 36 Pages.

William F. Foote, et al, "Apparatus And Methods For Communicating Between Resource Domains," U.S. Appl. No. 09/727,103, filed Nov. 29, 2000, 32 Pages.

William F. Foote, et al., "Terminating A Group Of Related Threads By Modifying The Prog Ram Counter Of Selected Stack Frames," U.S. Appl. No. 09/536,253, filed Mar. 27, 2000, 32 Pages.

William F. Foote and Hideya Kawahara "Apparatus and Methods for Managing Resources for Resource Constrained Devices", U.S. Appl. No. 10/045,514, filed Oct. 26, 2001, 35 pages.

Foote, Bill "Description of JavaOS and PersonalJava", Jul. 15, 2002, Release date of PersonalJava 1.0 is Dec. 1997.

Binder, Walter "*Design and Implementation of the J–SEAL2 Mobile Agent Kernel*", Application and the Internet, 2001.

Foote, William, "*Real–time Extensions to the Java Platform A Progress Report*", Electrical and Computer Engineering, 1999.

Chan, Patrick, et al. "The Java Class Library, Second Edition, vol. 1 (pp. 1723–1750) 1998".

* cited by examiner

CLEAN THREAD TERMINATION

CROSS-REFERENCE TO RELATED APPLICATIONS

The present application is related to pending applications (P4550, W. Foote, et. al.) and (P4155, K. Messer), herein incorporated by reference.

BACKGROUND OF THE INVENTION

1. Field of the Invention

The present invention relates generally to computer software. More specifically, it relates to software for cleanly and forcibly terminating threads, or other minimal units of program execution, in a computer language execution environment.

2. Discussion of Related Art

Computer processes are made up of one or more threads. A thread is generally known as a minimal unit of execution in a computer system. When a program wants to stop a thread, the thread involved must be terminated in a safe and sure manner to prevent unstable states of data structures or objects, other processes, and of other entities in the computer system. Some operating systems (OSs) support termination of thread in a forcible manner. Some of them also support some form of clean up of the OS system state after thread termination. However, in some computer language execution environments like Java language execution system, the forcible thread termination supported by an underlying OS is not applicable, because this termination is not enough to support safe and clean termination of threads executing in the language execution system. The mechanism supported by the OS may ensure that the OS state is not unstablized, but it does not prevent unstable states of data structures in the language execution system. Threads are stopped in various ways. One of the more common ways is to stop a thread from a user program using a command. In Java language it is known as Thread.stop( ). The user program communicates with the system by issuing the command to terminate a thread. Using Thread.stop( ) the target thread can be terminated anywhere in the code of a program. This can result in a damaged and unstable language execution system status and can hinder clean thread termination.

For example, if a thread is terminated while a function is executing, such as the FileInputStream.read( ) function in the Java language execution environment, one or more data structures being used in the function are left in an unstable state using the current Thread.stop( ). The Thread.stop( ) command may abort operations on the data structures in the middle and unlock all the monitors that have locks on any data structures the thread is using so that other functions can use them. As a result, the data structures are left in an inconsistent state. This prevents any subsequent functions using them from proper execution. In addition, a ThreadDeath exception is propagated up the chain of functions from the function in which a thread is being terminated to the thread start up function. During this process, the exception can get caught in one of the functions and it will ignore the exception. If the exception is not propagated, the thread that is supposed to be terminated may not stop. Moreover, the finally clause in a function is executed whenever the function is exited. Thus, during the propagation of the ThreadDeath exception, the finally clause will execute. The finally clause can include such an operation that keeps the thread running, thereby preventing the clean and certain termination of a thread.

In such a program language execution system that depends on the finally clause mechanism for cleanly unlocking monitors, if execution of the finally clause is ignored, any remaining locked monitors maybe kept locked; there is no guarantee that the objects locked will be unlocked. It is the completion of the finally clause that unlocks any remaining monitors locked in that function. This uncertainty also prevents clean thread termination since monitors may remain locked or unlocked. Generally, all the code in a finally clause should normally be executed when exiting a function. The finally clause should complete in a normal manner. If ignored, the monitors will remain locked, since the finally clause is responsible for unlocking resources when a process completes. If the data structures remain locked (i.e., the monitors keep their locks), other threads cannot access the data structures, which has other unwanted consequences.

In addition, another function known as Thread.interrupt( ) does not guarantee the clean and certain termination of a thread and cannot be used to arbitrarily terminate a thread from a user program.

Therefore, it would be desirable to have a method of cleanly and forcibly terminating a thread in a computer language execution environment. Such a method should leave no uncertainty about whether the thread has terminated and should not leave objects in the system in an unstable state or states.

SUMMARY OF THE INVENTION

A method of terminating a thread in a clean, certain, and forcible manner is described. A thread is forcibly terminated in such a manner that data structures in the system are not left in an inconsistent state and the overall system status is not damaged. The methods and systmes described are for terminating a thread in a computer language execution environment. Methods are implemented in an interpretive loop executing in a language that is interpreted and in runtime support libraries in a language that are not interpreted.

In one aspect of the invention, a method of forcibly terminating a thread in a computer language execution environment is described. A thread receives a terminate thread command. The thread has associated with it a termination flag, a value of the termination flag being immutable once set, and one or more monitors. The termination flag is then set for the thread. An exception is then propagated in the execution environment thereby indicating termination of the thread. The exception handler and the finally clause of the thread is ignored during thread termination. The monitors associated with the thread are then exited.

In one embodiment of the present invention a termination procedure is initiated to cleanly terminate the thread. A terminate thread command is issued by another thread. It is then determined whether the thread to be terminated is in a blocking position. In another embodiment it is determined whether the computer code containing the thread is part of a user-defined program to be terminated. In yet another embodiment locked monitors in the thread are associated with an execution frame in which the monitors are locked. The monitors are then exited when leaving the execution frame. In yet another embodiment the monitor lock operation is interrupted if the operation is initiated by a user-defined program. In yet another embodiment the computer language execution environment is the Java programming language execution environment. In yet another embodiment the thread has an associated termination flag indicator containing an immutable value and an execution field containing a mutable value. The terminate thread command is a modified thread.stop command in the Java programming language execution environment. In yet another embodiment the priority of the thread is checked and raised to avoid delay in terminating the thread. It is also determined whether the thread entered a monitor and whether the thread has successfully exited the monitor thereby indicating if the thread has terminated cleanly.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of terminating a thread in a clean, certain, and forcible manner is described in the various figures. A thread is forcibly terminated in such a manner that data structures in the system are not left in an inconsistent state and the overall system status is not damaged. The methods described are for terminating a thread in a computer language execution environment. In the described embodiment, the Java programming language execution environment is used to illustrate the invention and, as such, specific commands and functions referred to are from the Java environment. In other embodiments, the methods described herein can be used in other computer languages and environments, such as certain implementations of Visual Basic. More generally, the methods of the present invention are implemented in an interpretive loop executing in a language that is interpreted and in runtime support libraries in a language that are not interpreted.

Figure 1:
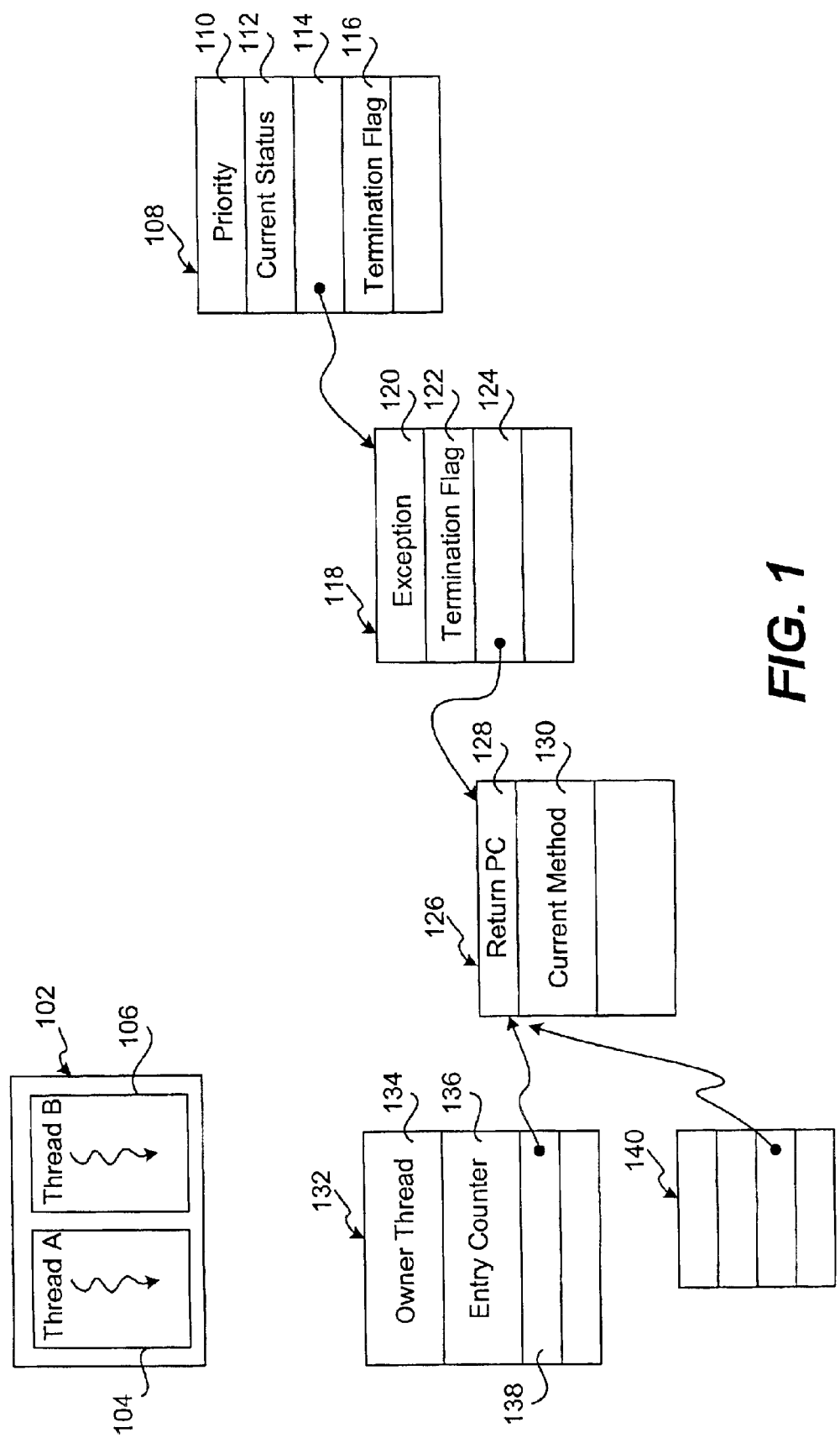
FIG. 1 is a diagram of a process having multiple threads and a data structure corresponding to a given thread in accordance with one embodiment of the present invention.

FIG. 1 is a diagram of a process having multiple threads and a data structure corresponding to a given thread in accordance with one embodiment of the present invention. A process 102 executes in a computer programming environment. Process 102 has two threads executing, thread 104 and thread 106, but can have more or fewer threads as is needed by the process. As mentioned above, a thread is typically a minimal unit of execution that takes place in a computer system and is executed to perform a discrete task. A thread has certain information about itself that the system or process needs to access. This data is kept in a thread data structure 108 as shown in FIG. 1.

Data structure 108 is created when the thread is created and is erased when the thread terminates. In the described embodiment, structure 108 is a set of data embodied using data structure types of the C programming language. In one embodiment, structure 108 has a priority field 110, a current status field 112, a pointer field 114 to an execution environment data structure, and a termination flag field 116. Current status field 112 has data regarding whether the thread is running, waiting, and so on. The number of fields can vary depending on the implementation of the system. The table is typically stored in non-persistent memory. In the described embodiment, termination flag field 116 is used to terminate the thread in a clean and forcible manner.

The termination flag value is immutable; that is, it cannot be changed back to zero once it is set to one. It is set to one when the thread is asked to terminate, and stays as one until the thread is terminated. By being immutable, the termination status of a thread cannot be reset, whether intentionally or accidentally, by remaining function or program execution by the terminating thread.

An execution environment data structure 118 contains numerous fields, including an exception field 120 relevant to the present invention. Field 120 contains an exception value if one has been received. In contrast to termination flag field 116, the value in exception field 120 is mutable. One type of exception is a ThreadDeath exception. In the Java execution environment, when a thread receives a ThreadDeath exception, the Java interpreter loop aborts the current program execution of the thread in the middle and may have undesirable consequences.

Some of the data in structure 118 can be stored in or combined with thread data structure 108 depending on the implementation. Instead of having termination flag 116 in structure 108, it can be placed in structure 118 as termination flag field 122 in another embodiment. Field 124 is a pointer to a current execution frame 126. Execution frame data structure 126 contains numerous fields such as return PC field 128 and current method field 130. Monitor operations are used when threads need to access some data structures exclusively. Monitor operations work on a target monitor. A monitor has certain information about itself that the system or process needs to access in order to process monitor operations and other related operations. This data is kept in a monitor data structure 132 as shown in FIG. 1. Data structure 132 is created when a thread creates the monitor and is erased when the data structure protected by the monitor is erased. In the described embodiment, structure 132 is a table. Monitor data structure 132 contains numerous fields such as an owner thread pointer field 134 and entry counter field 136. Monitor structure 132 also has a pointer field 138 to frame structure 126 that is relevant to the present invention. Another monitor structure 140 that points to the same frame structure 126 can exist in the program execution system. It is possible that frame structure 126 is pointed to by multiple monitor structures.

Figure 2:
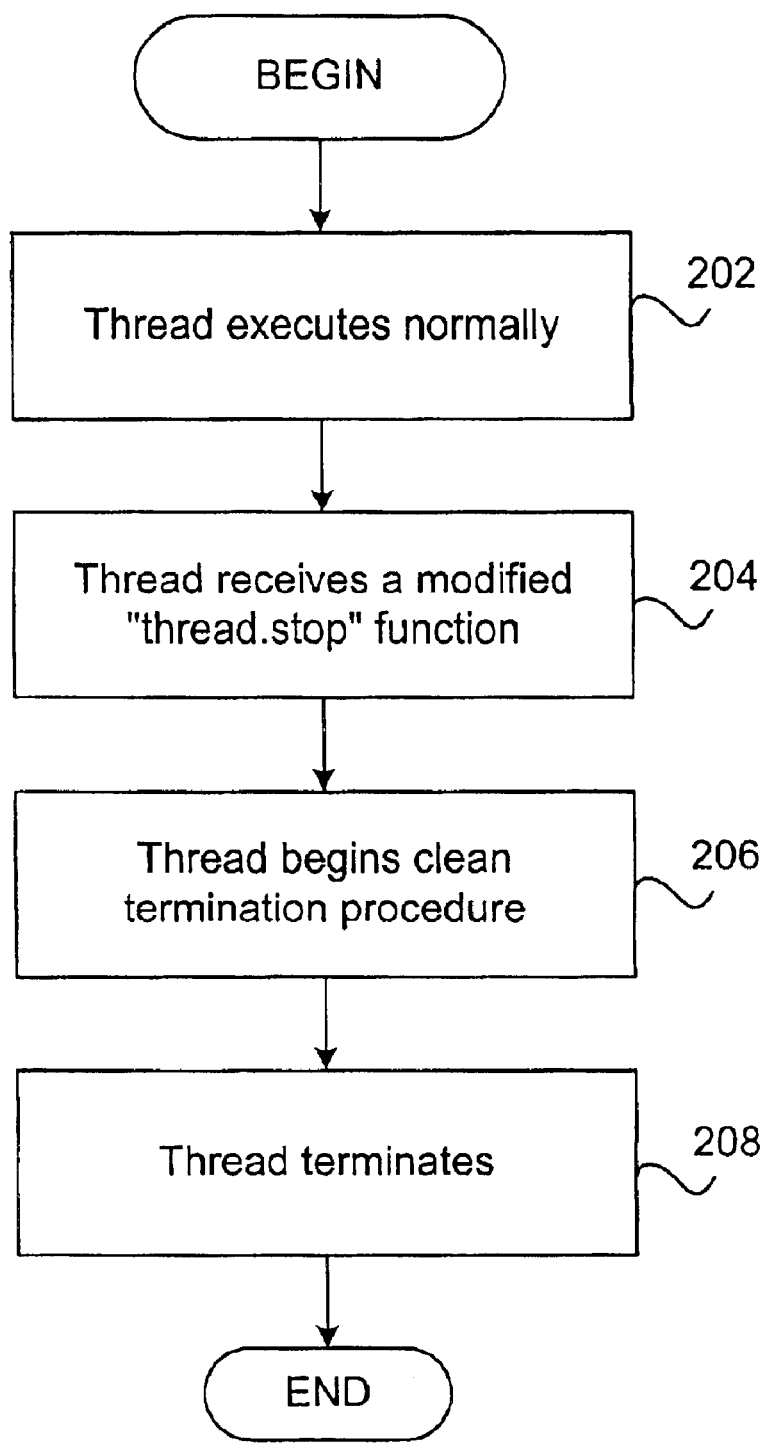
FIG. 2 is an overview flow diagram of a process for cleanly terminating a thread in accordance with one embodiment of the present invention.

FIG. 2 is an overview flow diagram of a process for cleanly terminating a thread in accordance with one embodiment of the present invention. This process and the ones described below are procedures added to and modifications to the interpreter loop of the non-native computing environment. At step 202 a thread, such as thread 104 or 106, is executing normally in a process. At step 204 the thread is notified of termination by execution of a modified Thread.stop( ) command in accordance with the present invention. This command is typically received from another thread. At step 206 the thread begins a clean termination procedure by performing a terminate thread command. This step is described in greater detail below. At step 208 the thread terminates in a clean and forcible manner without leaving any data structures in the system in an unstable state or in a locked status. Although the process is described for one thread, the process can be performed for a set of threads. It is not unusual that a set of threads, perhaps related to the same program or goal, or even all threads in the system need to be cleanly terminated.

Figure 3:
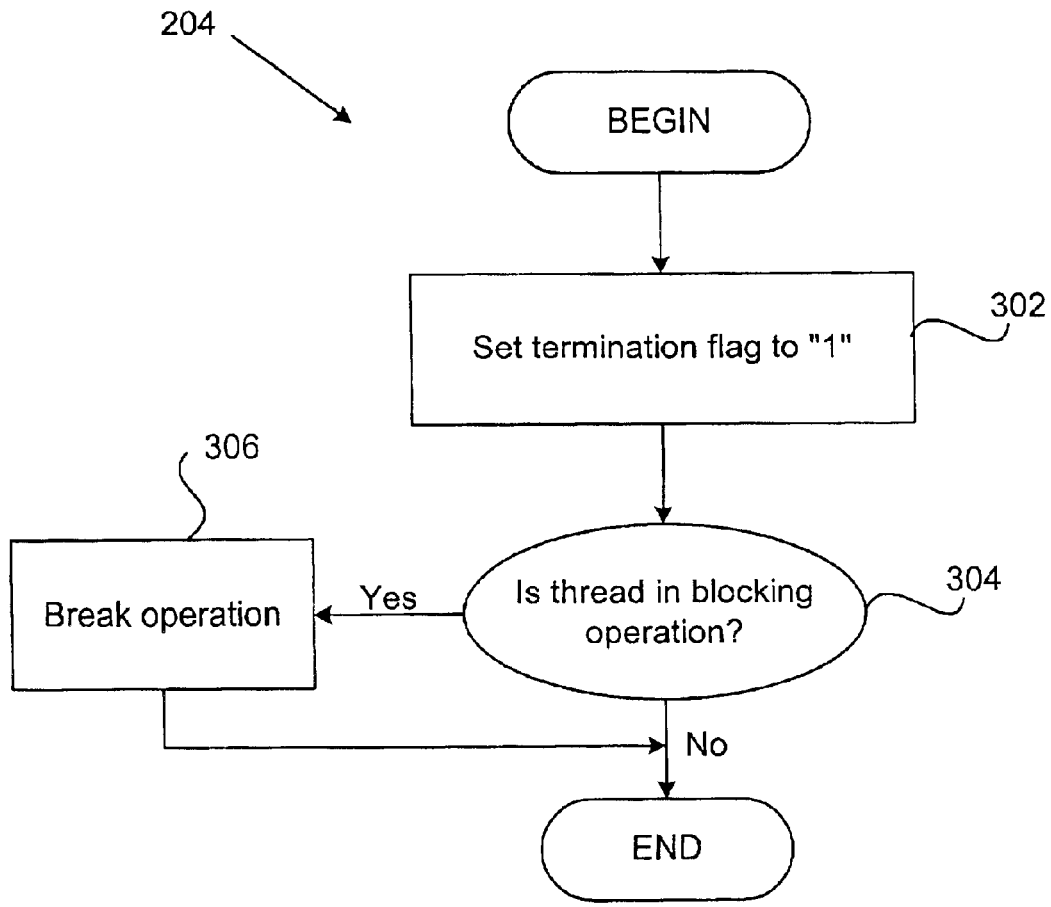
FIG. 3 is a flow diagram of a process that takes place when a modified Thread.stop( ) command is received by a thread in accordance with one embodiment of the present invention.

FIG. 3 is a flow diagram of a process that takes place when a modified Thread.stop command is received by a thread in accordance with one embodiment of the present invention. It explains in greater detail step 204 of FIG. 2. At step 302 termination flag in field 116 in data structure 108 is set to one. At step 304 the interpreter loop checks whether the thread to be terminated is in a blocking operation like opening a network connection, entering a monitor, and so on. If not, the sub-procedure of FIG. 3 is complete. If the thread is in a blocking operation, control goes to step 306 where the blocking operation is broken using an interrupt mechanism, such as one used in the Thread.Interrupt command. The operation of FIG. 3 is then complete. In addition, if the priority of the thread is low, the system can make the priority of the thread higher. This avoids any unnecessary delay in terminating the thread. If the number of threads to be terminated is greater than one, all the threads are suspended other than the thread calling or executing the Thread-.Stop command. By suspending all the threads, the specific act of setting the termination flag to one for each thread and breaking the blocking operation becomes an atomic operation. Atomicity is generally desirable and, in this case, avoids a partially terminated state in the system. Each thread to be terminated then goes through the procedure described in FIG. 3 and in the figures below.

Figure 4A:
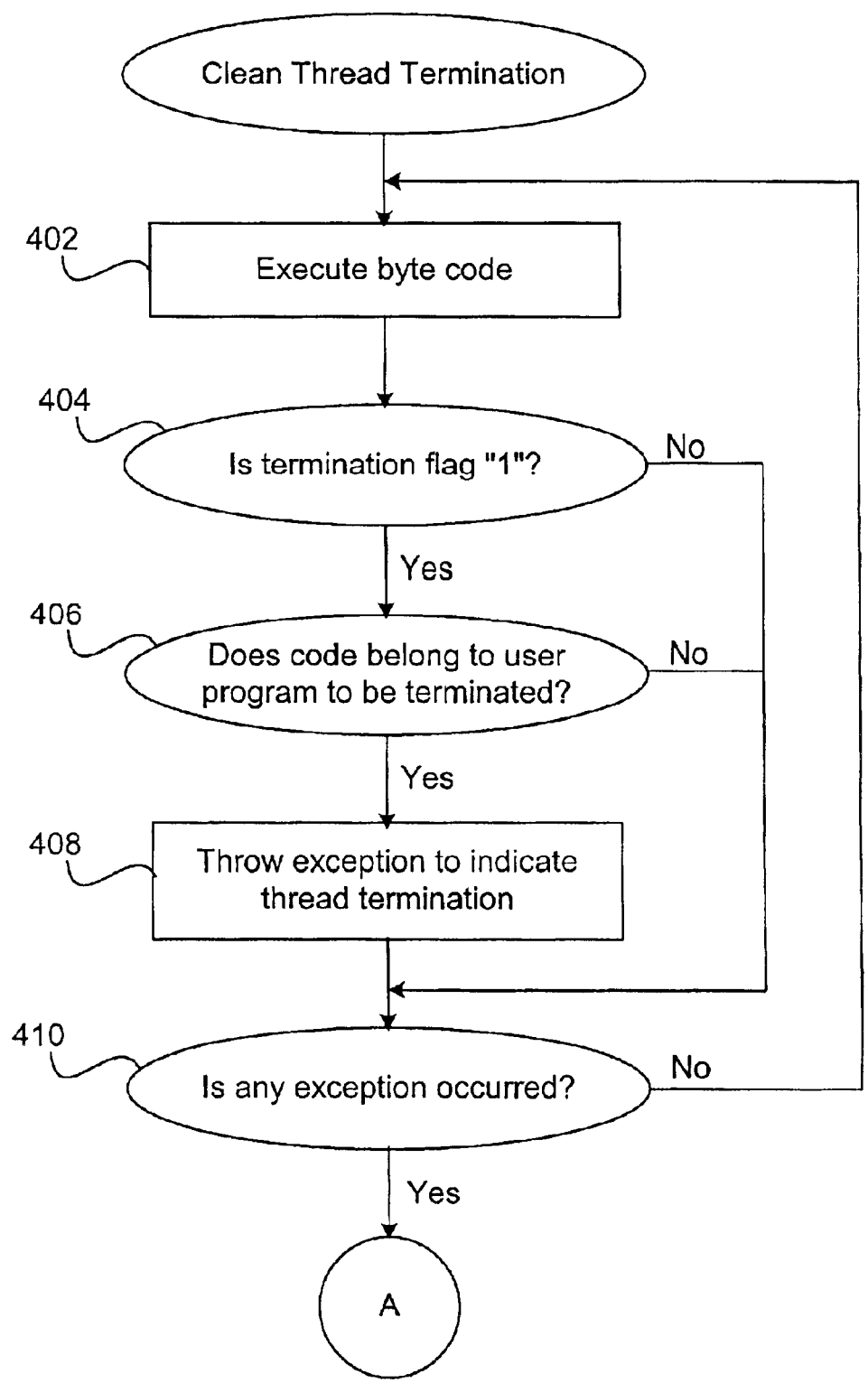
FIGS. 4A and 4B are flow diagrams of a process of cleanly and forcibly terminating a thread in an interpreter loop in accordance with one embodiment of the present invention.
Figure 4B:
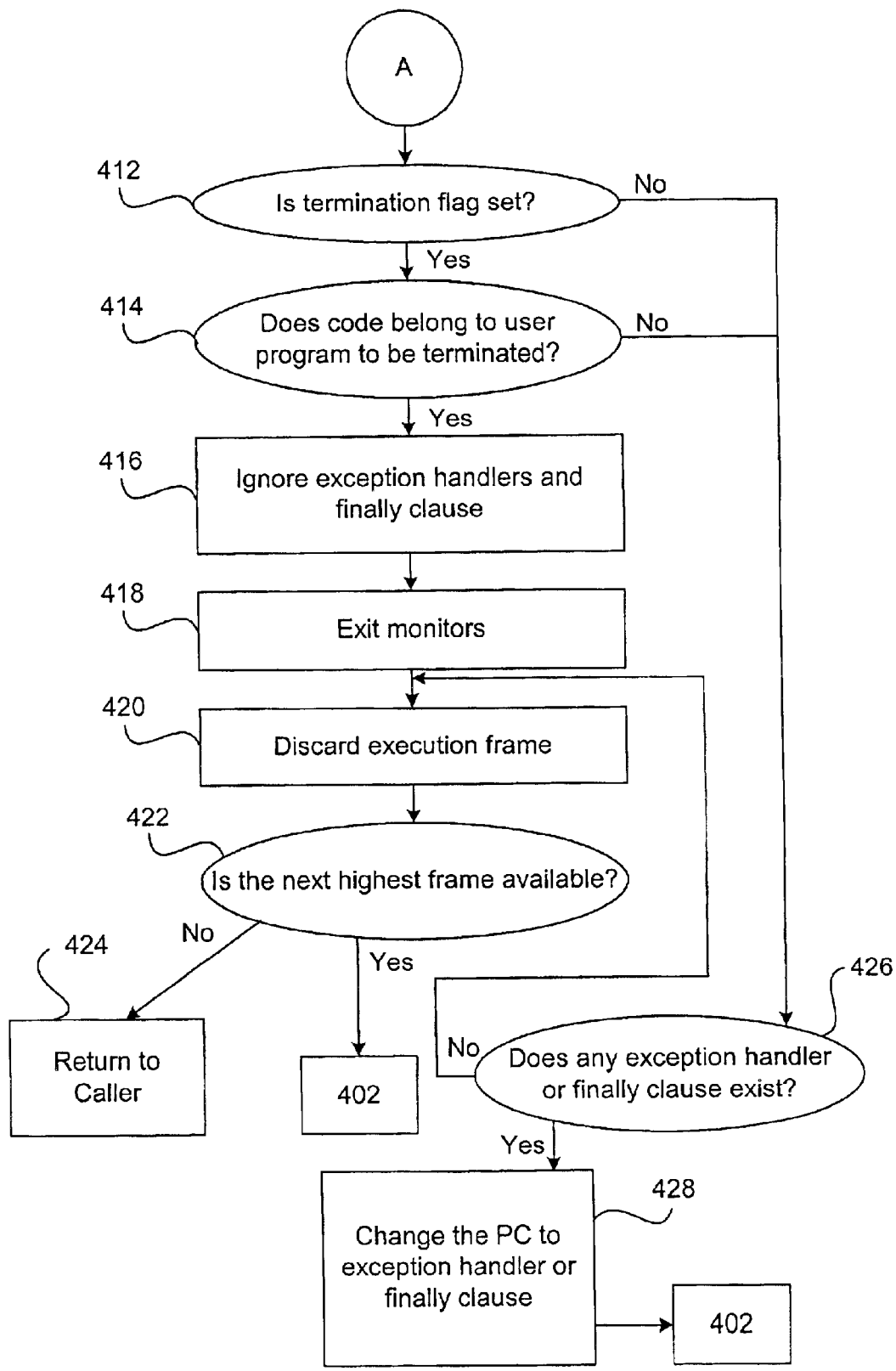

FIGS. 4A and 4B are flow diagrams of a process of cleanly and forcibly terminating a thread in an interpreter loop in accordance with one embodiment of the present invention. The interprerter loop in the Java computing environment is a component of the Java Virtual Machine. It takes in Java bytecodes and interprets or executes the bytecodes one by one. At step 402 the interpreter executes a Java bytecode. At step 404 the interpreter loop checks the termination flag of the thread that is currently executing the interpreter loop. If the flag is set to one, control goes to step 406. If a set of threads is being terminated, this check is done for each thread in the set. At step 406 the interpreter loop determines whether the code being executed by the thread that is to be terminated belongs to the user program. More specifically, it determines whether the code is not provided as part of the program execution environment. If the code does belong to the user program, control goes to step 408 where the interpreter loop throws an exception in the thread to indicate thread termination. The exception is placed in exception flag field 118 in the execution environment data structure described above.

If at step 404 the termination flag is not set, control goes to step 410. Similarly, if the code being executed by the thread does not belong to the user program at step 406, control also goes to step 410. At step 410 the interpreter loop checks if an exception in the exception flag field 118 is set. If so, control goes to step 412 of FIG. 4B. If not, control goes back to step 402. At step 412 of FIG. 4B the interpreter loop checks the termination flag field 116 as was performed at step 404. If the flag is set, control goes to step 414. If the flag is not set, interpreter loop goes to step 426. At step 414 the interpreter loop performs the same check it performed at step 406. At step 414 the interpreter loop determines whether the code being executed by the thread that is to be terminated belongs to the user program. More specifically, it checks whether it belongs to the user program or to some part of the execution environment. If the code does belong to the user program, control goes to step 416. If it does not, control goes to step 426. In step 426, it checks whether the applicable exception handlers and/or finally clause exist. If so, it continues to step 420. If not it continues to step 428. In step 428, it changes the program counter (that indicates a bytecode to be executed next) so that it points to the applicable exception handler or finally clause.

At step 416 the interpreter loop ignores the exception handlers and the finally clause in the user program. By ignoring the exception handlers and the finally clause, the interpreter loop is able to prevent running a user program containing the exception handlers and finally clauses. This will prevent threads from forcible termination. At step 418 the monitors associated with the current frame are exited thereby unlocking any data structures and other objects that were locked. This is done for the particular executing frame. That is, the particular function executing in the interpreter loop has its monitors released or exited. At this stage the frame itself is discarded or no longer executed. The interpreter loop then begins unlocking user data structures protected by these monitors. This is done for the current frame that is the particular frame executing. In one embodiment, all the monitors in the system are examined and unlock the monitors. At step 420, it discards the current execution frame. At step 422, it checks whether the next highest frame is available. If not, it continues to step 424 and returns to the caller. If so, the interpreter loop then continues execution of the next highest frame, as is normally done when a current frame is discarded. The process then continues by executing the next bytecode from the point indicated by a return program counter (PC) field 128 in FIG. 1 at step 402. If no more frames are available, then it continues to step 424. In step 424, it terminates the execution of the interpreter loop and returns to the caller function.

A thread cannot be terminated cleanly if the thread is in a monitor. As is known in the field of computer programming a monitor can be described as a primitive mechanism for achieving exclusive execution of software code; that is, it protects software code from mutual or multiple thread execution. It is also used to synchronize code execution using functions such as monitor-enter, monitor-wait, monitor-exit, and monitor-notify.

Monitor-enter is a blocking operation since a monitor that is locked by another thread can not be entered. Monitor-enter operation suspends execution until the thread that locked the monitor performs monitor-exit or monitor-wait. If a thread is blocked by a monitor-enter operation, that thread cannot be said to have broken the blocking operation cleanly, and thus has not terminated cleanly if it does not break the monitor-enter operation safely. This is because a monitor can be used for protecting system data structures and, in that case, breaking the monitor-enter operation can damage the system data structures. This is not an acceptable state in which to leave the execution environment. In addition, if a thread successfully entered the monitor, that thread cannot be said to have terminated cleanly if it does not exit the monitor. This is because a monitor can only be used by another thread if the monitor has been exited. If the monitor is not effectively exited or released when a thread using it has been terminated, that thread has not been terminated cleanly. It has left behind a locked-up or unusable monitor which very likely has other threads waiting to use it but cannot. This is not an acceptable state in which to leave the execution environment. Essentially, there must be some kind of monitor maintenance mechanism to achieve the monitor clean-up step (step 418 of FIG. 4B) during thread termination.

Figure 5A:
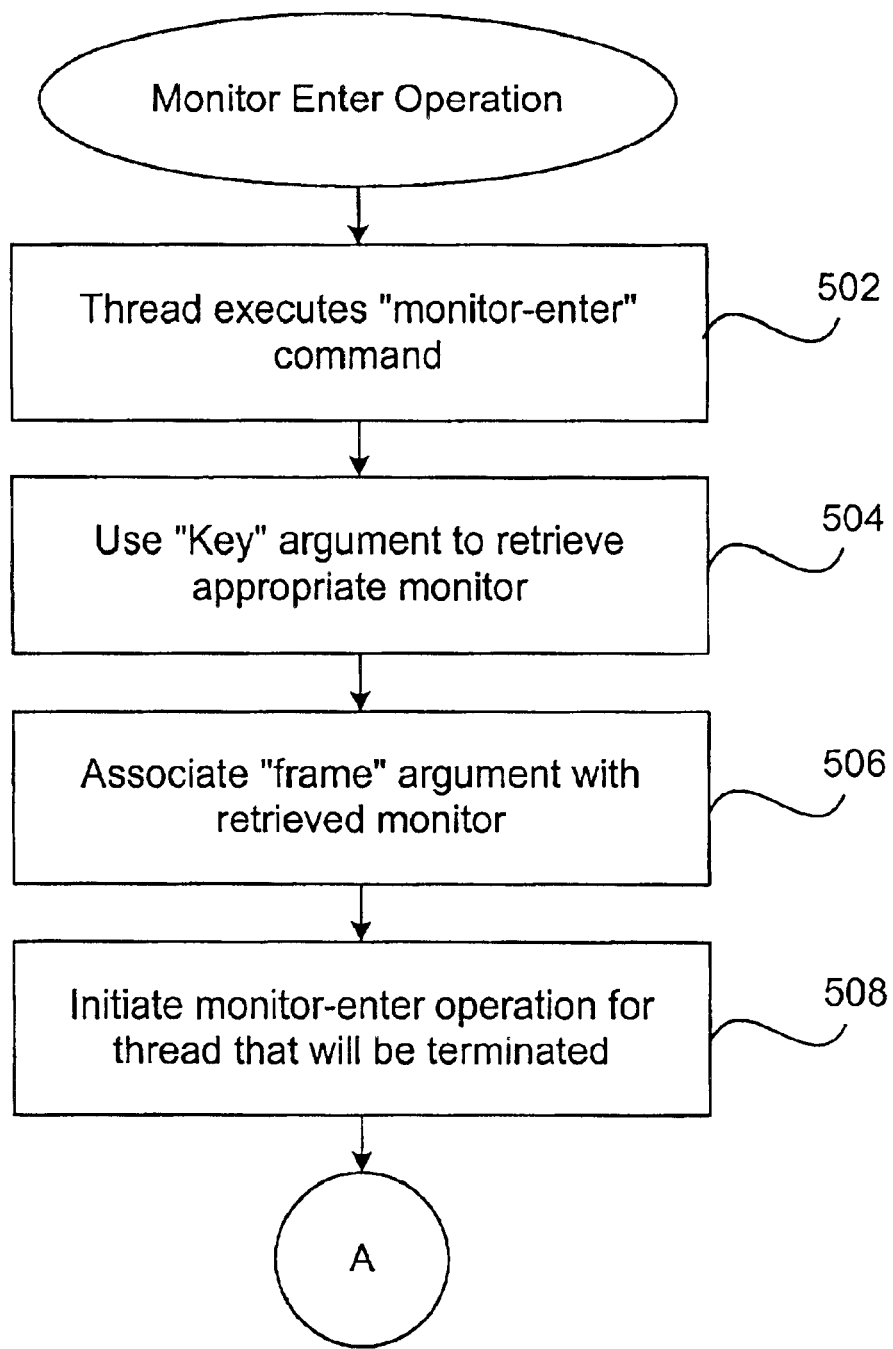
FIGS. 5A and 5B are flow diagrams of a monitor operation process for terminating a thread cleanly in accordance with one embodiment of the present invention.
Figure 5B:
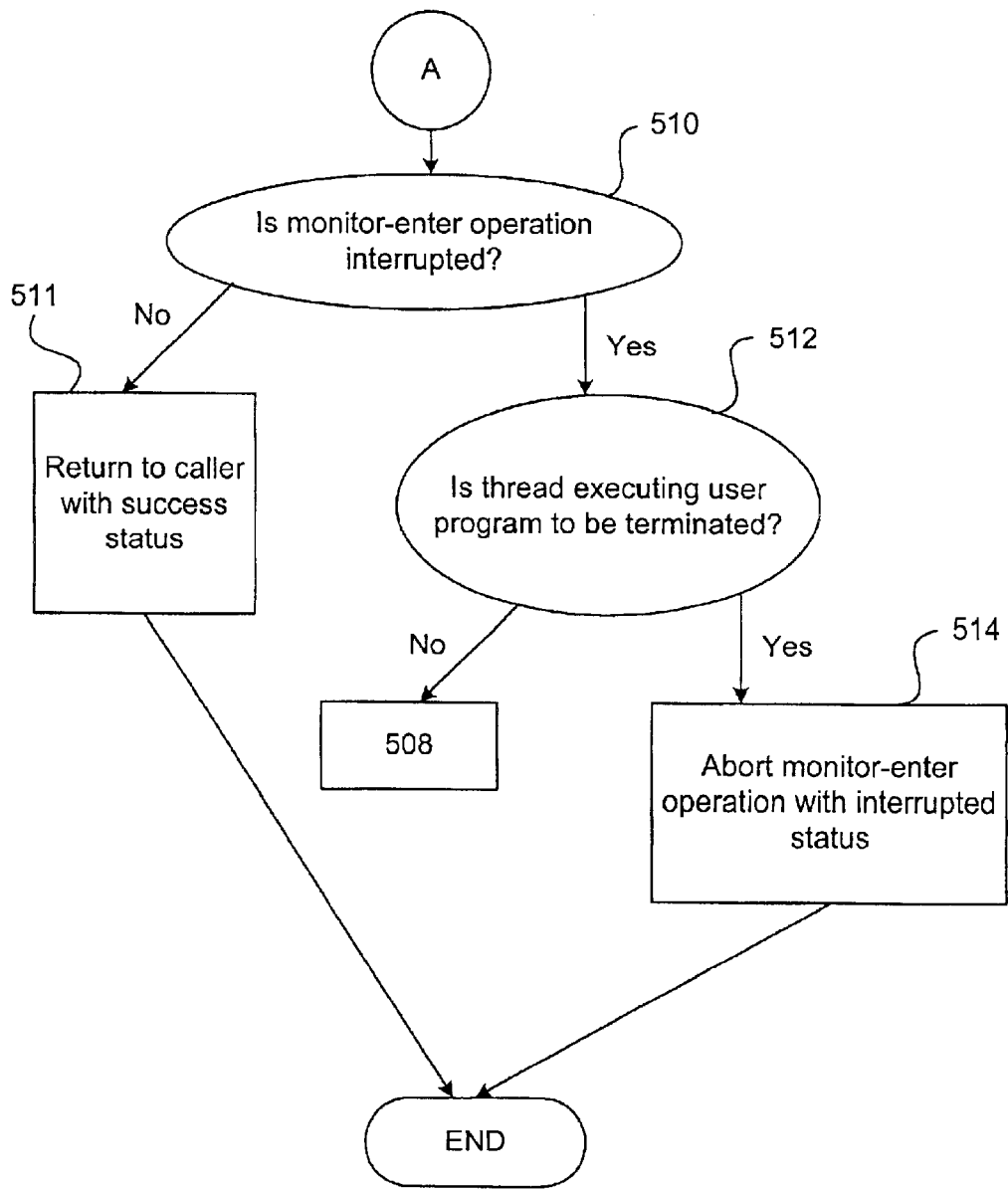

FIGS. 5A and 5B are flow diagrams of a monitor operation process for terminating a thread cleanly in accordance with one embodiment of the present invention. At step 502 the thread (to be terminated) executes a monitor-enter operation command thereby entering a monitor. A monitor-enter operation is a standard operating system function. At step 504 a key argument to the monitor-enter function is used to retrieve the appropriate monitor as is known in the field of computer programming. The key is a unique identifier for the monitor since there maybe multiple monitors available in the execution environment or program. At step 506 a frame argument is associated with the appropriate monitor. In the described embodiment the frame argument can be described as a data structure representing current execution data shown as data structure 126 in FIG. 1.

At step 508 the thread is able to initiate the actual monitor-enter operation; that is, the thread is able to enter the monitor. Specifically, the thread performs an interruptible monitor-enter operation. It is at this stage that other threads have to wait to use the monitor and can only use it when the monitor is released or unlocked. At step 510 of FIG. 5B it is determined whether the enter operation is interrupted (unblocked). If so, it continues step 512. If not, it continues step 511 and returns to the caller with success status. In step 512, it is determined whether the thread to be terminated is executing user code of a program to be terminated. If the thread is not executing user code of a program to be terminated, monitor execution continues to step 508. This is because a thread not executing user code of a program to be terminated cannot be terminated in order to keep consistent system status. If at step 512 it is determined that the thread is executing user code of a program to be terminated, the monitor-enter operation is aborted and an interrupted status message is returned to the caller function.

After a thread invokes and completes a monitor-enter operation, a monitor-wait function can be performed or invoked by the thread. Once a thread is in a monitor-wait operation and the thread is to be terminated, the frame associated with the monitor at step 506 is actually retrieved. One of the threads that is blocked or suspended from using the monitor, continues its execution. It is the distinction between first associating a frame with a monitor and then retrieving the frame for the monitor that, in part, allows for a thread to be terminated without leaving behind an unusable or locked monitor. Once the frame is retrieved, the value of the frame which reflects the execution environment is saved in the system. At this stage an interruptable monitor-wait operation is performed by the thread. If the wait is exited normally, the saved frame is re-associated with the monitor. If the wait is interrupted, an interrupted status will be returned to the caller.

Finally, the thread performs a monitor-exit operation. During this operation, a monitor for a given key is retrieved. Any frames associated with that monitor are then disassociated with the monitor. This disassociation is for not unlocking exited and unused monitor mistakingly in step 418 in FIG. 4B. Variations on the above procedures can include associating the monitor with the frame in the monitor-enter operation. As mentioned the frame has a pointer to a monitor which allows an association to be recognized in both directions. In another embodiment, the monitor is disassociated from the frame in the monitor-wait operation.

The present invention may employ various computer-implemented operations involving information stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms such as, producing, identifying, running, determining, comparing, executing, downloading, or detecting. It is sometimes convenient, principally for reasons of common usage, to refer to these electrical or magnetic signals as bits, values, elements, variables, characters, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 6:
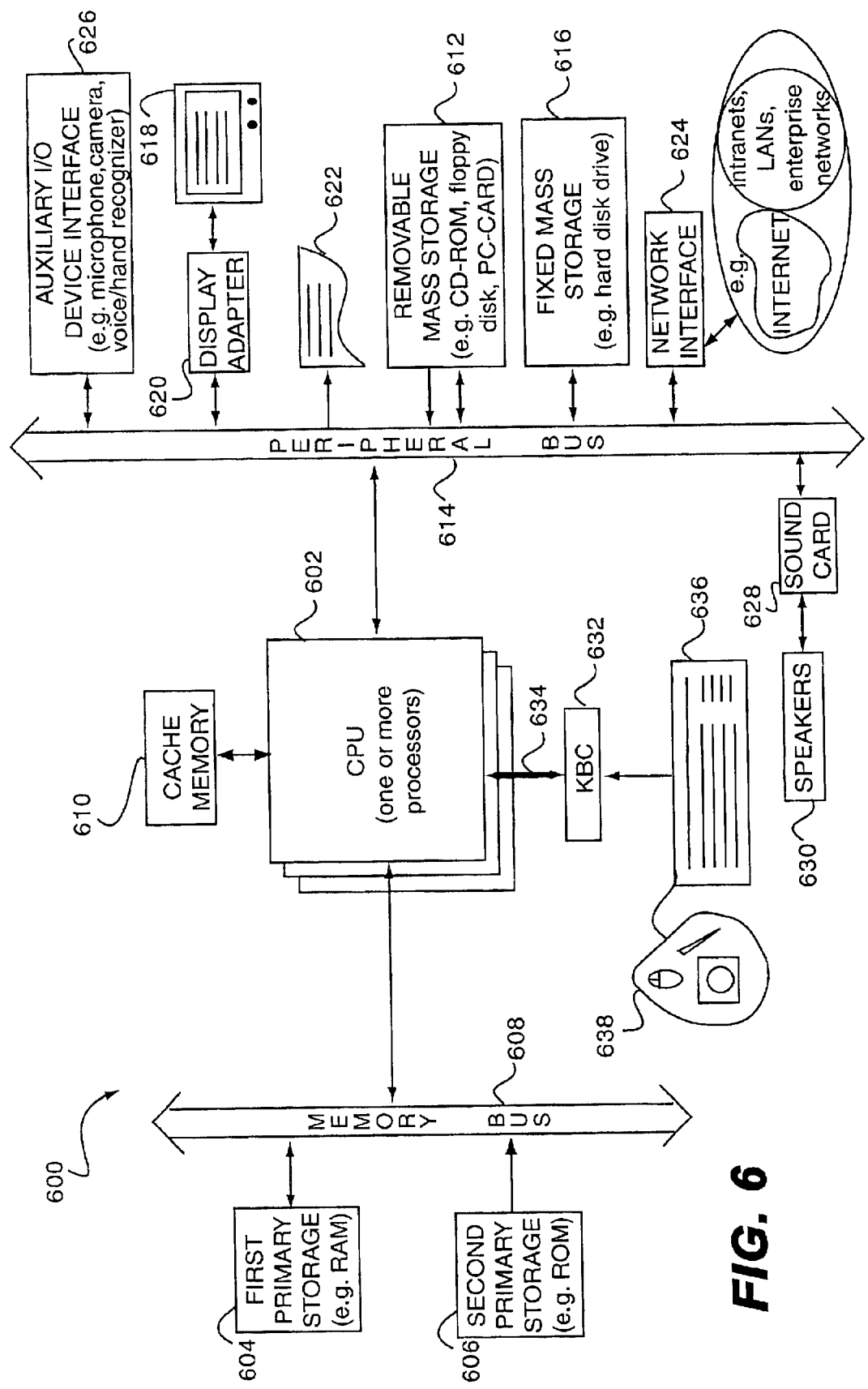
FIG. 6 is a block diagram of a typical computer system suitable for implementing an embodiment of the present invention.

FIG. 6 is a block diagram of a general purpose computer system 600 suitable for carrying out the processing in accordance with one embodiment of the present invention. For example, a JVM or bytecode compiler can run on general purpose computer system 600. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. CPU 602 is a general purpose digital processor which controls the operation of the computer system 600. Using instructions retrieved from memory, the CPU 602 controls the reception and manipulation of input information, and the output and display of information on output devices.

CPU 602 is coupled bi-directionally with a first primary storage 604, typically a random access memory (RAM), and uni-directionally with a second primary storage area 606, typically a read-only memory (ROM), via a memory bus 608. As is well known in the art, primary storage 604 can be used as a general storage area and as scratch-pad memory, and can also be used to store input data and processed data.

It can also store programming instructions and data, in addition to other data and instructions for processes operating on CPU 602, and is typically used for fast transfer of data and instructions bi-directionally over memory bus 608. Also, as is well known in the art, primary storage 606 typically includes basic operating instructions, program code, data and objects used by the CPU 602 to perform its functions. Primary storage devices 604 and 606 may include any suitable computer-readable storage media, described below, depending on whether, for example, data access needs to be bi-directional or uni-directional. CPU 602 can also directly and very rapidly retrieve and store frequently needed data in a cache memory 610.

A removable mass storage device 612 provides additional data storage capacity for the computer system 600, and is coupled either bi-directionally or uni-directionally to CPU 602 via a peripheral bus 614. For example, a specific removable mass storage device commonly known as a CD-ROM typically passes data uni-directionally to the CPU 602, whereas a floppy disk can pass data bi-directionally to the CPU 602. Storage 612 may also include computer-readable media such as magnetic tape, flash memory, signals embodied in a carrier wave, Smart Cards, portable mass storage devices, and other storage devices. A fixed mass storage 616 also provides additional data storage capacity and is coupled bi-directionally to CPU 602 via peripheral bus 614. Generally, access to these media is slower than access to primary storages 604 and 606. Mass storage 612 and 616 generally store additional programming instructions, data, and the like that typically are not in active use by the CPU 602. It will be appreciated that the information retained within mass storage 612 and 616 may be incorporated, if needed, in standard fashion as part of primary storage 604 (e.g. RAM) as virtual memory.

In addition to providing CPU 602 access to storage subsystems, the peripheral bus 614 is used to provide access to other subsystems and devices as well. In the described embodiment, these include a display monitor 618 and adapter 620, a printer device 622, a network interface 624, an auxiliary input/output device interface 626, a sound card 628 and speakers 630, and other subsystems as needed.

The network interface 624 allows CPU 602 to be coupled to another computer, computer network, or telecommunications network using a network connection as referred to. Through the network interface 624, it is contemplated that the CPU 602 might receive information, e.g., objects, program instructions, or bytecode instructions from a computer in another network, or might output information to a computer in another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 624.

Auxiliary I/O device interface 626 represents general and customized interfaces that allow the CPU 602 to send and, more typically, receive data from other devices. Also coupled to the CPU 602 is a keyboard controller 632 via a local bus 634 for receiving input from a keyboard 636 or a pointer device 638, and sending decoded symbols from the keyboard 636 or pointer device 638 to the CPU 602. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs). The computer-readable medium can also be distributed as a data signal embodied in a carrier wave over a network of coupled computer systems so that the computer-readable code is stored and executed in a distributed fashion.

It will be appreciated by those skilled in the art that the above described hardware and software elements are of standard design and construction. Other computer systems suitable for use with the invention may include additional or fewer subsystems. In addition, memory bus 608, peripheral bus 614, and local bus 634 are illustrative of any interconnection scheme serving to link the subsystems. For example, a local bus could be used to connect the CPU to fixed mass storage 616 and display adapter 620. The computer system referred to in FIG. 6 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of forcibly terminating a thread in a computer language execution environment comprising:
    a first thread receiving a terminate thread command, the first thread having an associated termination flag, a value of the termination flag being immutable once set and having one or more monitors;
    setting the termination flag for the first thread;
    propagating an exception in the execution environment thereby indicating termination of the first thread;
    ignoring at cast one exception handler and a finally clause of the first thread; and
    existing one or more monitors associated with the first thread.

2. A method as recited in claim 1 further comprising initiating a termination procedure to cleanly terminate the first thread.

3. A method as recited in claim 1 wherein receiving a terminate thread command further comprises a second thread issuing the termination thread command.

4. A method as recited in claim 1 further comprising determining whether the first thread is in a blocking operation.

5. A method as recited in claim 1 further comprising determining whether a first computer code is part of a user-defined program to be terminated.

6. A method as recited in claim 1 further comprising:
associating the one or more monitors locked in the first thread with an execution frame in which the one or more monitors are locked; and
exiting the associated one or more monitors when leaving the execution frame.

7. A method as recited in claim 1 further comprising interrupting a monitor lock operation if the monitor lock operation is initiated by a user defined program, the user defined program to be terminated when thread termination is requested.

8. A method as recited in claim 1 wherein the computer language execution environment is the Java programming language execution environment.

9. A method as recited in claim 1 wherein the first thread has an associated termination flag indicator containing an immutable value and an execution field containing a mutable value.

10. A method as recited in claim 1 wherein the terminate thread command is a modified threadstop command in the Java programming language execution environment.

11. A method as recited in claim 1 further comprising checking a priority of the first thread and, if desired, raising the priority of the thread to avoid delay in terminating the first thread.

12. A method as recited in claim 1 wherein the first thread is cleanly and forcibly terminated in an interpreter loop.

13. A method as recited in claim 12 wherein the interpreter loop is a component of the Java Virtual Machine.

14. A method as recited in claim 1 further comprising determining whether the first thread entered a monitor and whether the first thread has successfully exited the monitor thereby determining whether the first thread has terminated cleanly.

15. An apparatus for forcibly terminating a thread in a computer language execution environment, the apparatus comprising:
means for a first thread to receive a terminate thread command, the first thread having an associated termination flag, a value of the termination flag being immutable once set and having one or more monitors;
means for setting the termination flag for the first thread;
means for propagating an exception in the execution environment thereby indicating termination of the first thread;
means for ignoring at least one exception handler and a finally clause of the first thread; and
means for exiting one or more monitors associated with the first thread.

16. An apparatus as recited in claim 15 further comprising:
means for associating the one or more monitors locked in the first thread with an execution frame in which the one or more monitors are looked; and
means for exiting the associated one or more monitors when leaving the execution frame.

17. An apparatus as recited in claim 15 further comprising means for interrupting a monitor lock operation if the monitor lock operation is initiated by a user defined program, the user defined program to be terminated when thread termination is requested.

18. An apparatus as recited in claim 15 further comprising means for determining whether the first thread entered a monitor and whether the first thread has successfully exited the monitor thereby determining whether the first thread has terminated cleanly.

19. A computer-readable medium containing programmed instructions arranged to forcibly terminate a thread in a computer language execution environment, the computer-readable medium including programmed instructions for:
a first thread receiving a terminate thread command, the first thread having an associated termination flag, a value of the termination flag being immutable once set end having one or more monitors;
setting the termination flag for the first thread;
propagating an exception in the execution environment thereby indicating termination of the first thread;
ignoring at least one exception handler and a finally clause of the first thread; and
exiting one or more monitors associated with the first thread.

20. A system for forcibly terminating a thread in a computer language execution environment, the system comprising:
a processor; and
a computer readable medium storing a program for execution by the processor, the program comprising:
computer code for, at a first thread, receiving a terminate thread command, the first thread having an associated termination flag, a value of the termination flag being immutable once set and having one or more monitors;
computer code for setting the termination flag for the first thread;
computer code for propagating an exception in the execution environment thereby indicating termination of the first thread;
computer code for ignoring at least one exception handler and a finally clause of the first thread; and
computer code for exiting one or more monitors associated with the first thread.

* * * * *

UNITED STATES PATENT AND TRADEMARK OFFICE
CERTIFICATE OF CORRECTION

PATENT NO. : 6,910,209 B2
DATED : June 21, 2005
INVENTOR(S) : Kawahara et al.

It is certified that error appears in the above-identified patent and that said Letters Patent is hereby corrected as shown below:

Column 10,
Line 55, change "at cast" to -- at least --.
Line 57, change "existing one" to -- exiting one --.

Column 12,
Line 3, change "are looked" to -- are locked --.
Line 25, change "end having" to -- and having --.

Signed and Sealed this

Sixth Day of September, 2005

JON W. DUDAS
*Director of the United States Patent and Trademark Office*